US010953705B2

(12) United States Patent
Lyu et al.

(10) Patent No.: US 10,953,705 B2
(45) Date of Patent: Mar. 23, 2021

(54) AUTOMATIC CONSTANT PRESSURE DEVICE FOR HUB TIRE SYSTEM

(71) Applicant: CITIC DICASTAL CO., LTD, Hebei (CN)

(72) Inventors: Jinqi Lyu, Hebei (CN); Zhipeng Li, Hebei (CN); Hanbao Sun, Hebei (CN); Hongfu Jin, Hebei (CN); Yanfu Xu, Hebei (CN); Yingfeng Wang, Hebei (CN); Chunhai Liu, Hebei (CN); Zhihua Zhu, Hebei (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 349 days.

(21) Appl. No.: 16/053,096

(22) Filed: Aug. 2, 2018

(65) Prior Publication Data
US 2019/0257600 A1 Aug. 22, 2019

(30) Foreign Application Priority Data

Feb. 22, 2018 (CN) .......................... 201810153486.0

(51) Int. Cl.
*B60C 23/00* (2006.01)
*B60C 29/06* (2006.01)
(Continued)

(52) U.S. Cl.
CPC .. *B60C 23/00318* (2020.05); *B60C 23/00305* (2020.05); *B60C 23/00354* (2020.05);
(Continued)

(58) Field of Classification Search
CPC ....... B60C 23/003; B60C 23/04; B60C 23/16; B60C 29/068; B60C 23/00305;
(Continued)

(56) References Cited

U.S. PATENT DOCUMENTS 6,161,565 A * 12/2000 Conroy, Sr. ........... B60C 23/004
137/224
2005/0178437 A1 * 8/2005 Schultz ................. F16K 15/207
137/224
(Continued)

FOREIGN PATENT DOCUMENTS

DE 2918481 A1 11/1980
EP 2974892 1/2016

OTHER PUBLICATIONS

European Search Report; Munich; dated Jun. 21, 2019.

*Primary Examiner* — Kip T Kotter
(74) *Attorney, Agent, or Firm* — IPro, PLLC; Qian Gu

(57) ABSTRACT

The invention provides an automatic constant pressure device for a hub tire system. The device comprises a valve nozzle, air pipes, valves, a pneumatic slip ring, a hub, a pressure relief valve, a tire, a main shaft, an air storage tank, a vehicle-mounted air source and the like. Two valve holes are machined in the hub of the device. The valve nozzle with a tire pressure sensor is installed at one valve hole, and the pressure relief valve is installed at the other valve hole. The tire pressure is detected by the tire pressure sensor. The valve is controlled to inflate through the valve nozzle, and the pressure relief valve is controlled to relieve the pressure. The device has the characteristics of scientific detection principle, simple and reasonable structure and the like.

2 Claims, 2 Drawing Sheets

(51) Int. Cl.
  *F16K 17/06* (2006.01)
  *B60C 23/16* (2006.01)
  *B60B 27/00* (2006.01)
  *B60C 23/04* (2006.01)
  *B60K 7/00* (2006.01)

(52) U.S. Cl.
  CPC ............ B60C 23/16 (2013.01); B60C 29/068 (2013.01); F16K 17/06 (2013.01); *B60B 27/00* (2013.01); *B60B 2900/212* (2013.01); *B60B 2900/513* (2013.01); *B60C 23/005* (2013.01); *B60C 23/04* (2013.01); *B60K 7/0007* (2013.01)

(58) Field of Classification Search
  CPC ......... B60C 23/00354; B60C 23/00318; F16K 17/06; F28F 27/00
  See application file for complete search history.

(56) References Cited

U.S. PATENT DOCUMENTS

| | | | |
|---|---|---|---|
| 2007/0187015 A1* | 8/2007 | Alff | B60C 23/003 152/418 |
| 2008/0035203 A1* | 2/2008 | Caretta | F16K 17/06 137/12 |
| 2014/0028080 A1 | 1/2014 | Weber et al. | |
| 2018/0345740 A1* | 12/2018 | Vitolo | B60C 23/003 |

* cited by examiner

AUTOMATIC CONSTANT PRESSURE DEVICE FOR HUB TIRE SYSTEM

CROSS REFERENCE TO RELATED APPLICATION

This application claims priority to Chinese Patent Application No. 201810153486.0, entitled AUTOMATIC CONSTANT PRESSURE DEVICE FOR HUB TIRE SYSTEM and filed on Feb. 22, 2018, which is incorporated herein by reference in its entirety and for all purposes.

FIELD OF THE INVENTION

The present invention relates to an automatic constant pressure device for a hub tire system, which is used for automatic constant pressure cooling of an automobile hub tire system and belongs to the technical field of automatic control on automobiles.

BACKGROUND OF THE INVENTION

The automatic constant pressure device for a hub tire system is a device specially used for automatic constant pressure cooling of the automobile hub tire system to prevent burst of the hub tire due to high temperature accumulation during driving, and belongs to the technical field of automatic control on automobiles.

In the case of high-speed running and high temperature in summer, air pressure in the tire increases, so that tire burst is likely to occur, and traffic accidents may occur in serious cases. Especially in rapidly developing new energy vehicles at present, hub motors have been developed rapidly. However, the hub motor occupies a large space in a hub rim, which is not conducive to the heat dissipation of the tire system.

Generally, the hub tire system mostly prevents tire burst by spraying water to reduce temperature and pressure. This method wastes water resources, and the water cannot be recycled. Disclosed in Chinese patent No. 200910215960.9, entitled Water-Cooled Reluctance Stator Winding Wheel Motor, is a circulating water cooling and pressure reduction device built in a hub motor of a new energy vehicle. However, the device is relatively complex in structure and not easy to install and maintain due to the staggered circuit and water passage, and the water pipe is easily blocked, leading to the reduction of the cooling effect.

SUMMARY OF THE INVENTION

Therefore, the present invention provides an automatic constant pressure device for a hub tire system. The device can keep the air pressure in the hub tire system constant, avoid tire burst due to the increase of the tire pressure, and can also automatically supplement the air pressure to prevent idling caused by too low tire pressure.

An automatic constant pressure device for a hub tire system includes a valve nozzle, an air pipe A, a valve, a pneumatic slip ring, a hub, a pressure relief valve, a tire, a main shaft, an air storage tank, an air pipe B, a valve and a vehicle-mounted air source.

The hub of the present invention is provided with double valve holes, the valve nozzle is installed at one valve hole, the pressure relief valve is installed at the other valve hole, and the phase difference of the two valve holes is 180°.

The pneumatic slip ring is installed on the main shaft, and the rotating portion of the pneumatic slip ring can rotate synchronously with the hub.

The valve nozzle is provided with a tire pressure sensor that can be integrated with a tire temperature sensor at the same time. The air pipe A is installed at the inflatable end of the valve nozzle through threaded connection, the one-way valve is installed on the air pipe A, the other end of the one-way valve is connected to the air pipe A, and the air pipe A is connected to the pneumatic slip ring. The vehicle-mounted air source is installed on the main shaft, and the vehicle-mounted air source (12) is installed on a chassis suspension of a vehicle.

The valve is installed in the air path to inflate the vehicle-mounted air source; and the valve is used for inflating the tire through the valve nozzle.

The air storage tank is fixed on the main shaft, the air pipe B is installed on the air storage tank, the valve is installed at the other end of the air pipe B, the valve is a solenoid valve, and the other end of the valve is connected to the vehicle-mounted air source through the air pipe B.

In the automatic constant pressure device for the hub tire system, the tire pressure is automatically detected by the tire pressure sensor and automatically controlled by adopting the automatic control principle. The working principle is: when the pressure in the tire is higher than a set value, for example, the tire pressure is set to 200 kPa±20 kPa, when the tire pressure is higher than 220 kPa, the pressure can be relieved to 200 kPa±20 kPa through the pressure relief valve; and when the tire pressure is lower than 180 kPa, the tire can be inflated to 200 kPa±20 kPa through the valve.

In the automatic constant pressure device for the hub tire system, the tire pressure sensor can be integrated with a temperature sensor that automatically detects the tire temperature, and the tire temperature is automatically controlled by adopting the automatic control principle. The working principle is: when the temperature in the tire is higher than a set value, for example, the tire temperature is set to 70° C.±10° C., when the tire temperature is higher than 80° C., the temperature can be reduced by circulating the air in the tire, that is, the pressure relief valve is opened to relieve the pressure, the valve is opened at the same time to inflate the tire, and the tire pressure is kept at 200 kPa±20 kPa while the temperature is reduced; and when the tire temperature is lower than 60° C., the valve is closed to stop inflating the tire, and the pressure relief valve is closed at the same time to stop pressure relief.

The device of the present invention can automatically keep the air pressure in the hub tire system constant, avoid tire burst due to the increase of the tire pressure, and can also automatically supplement the air pressure to prevent idling caused by too low tire pressure.

BRIEF DESCRIPTION OF THE DRAWINGS

The embodiments of the present invention will be described in detail in combination with the accompanying drawings.

Figure 1:
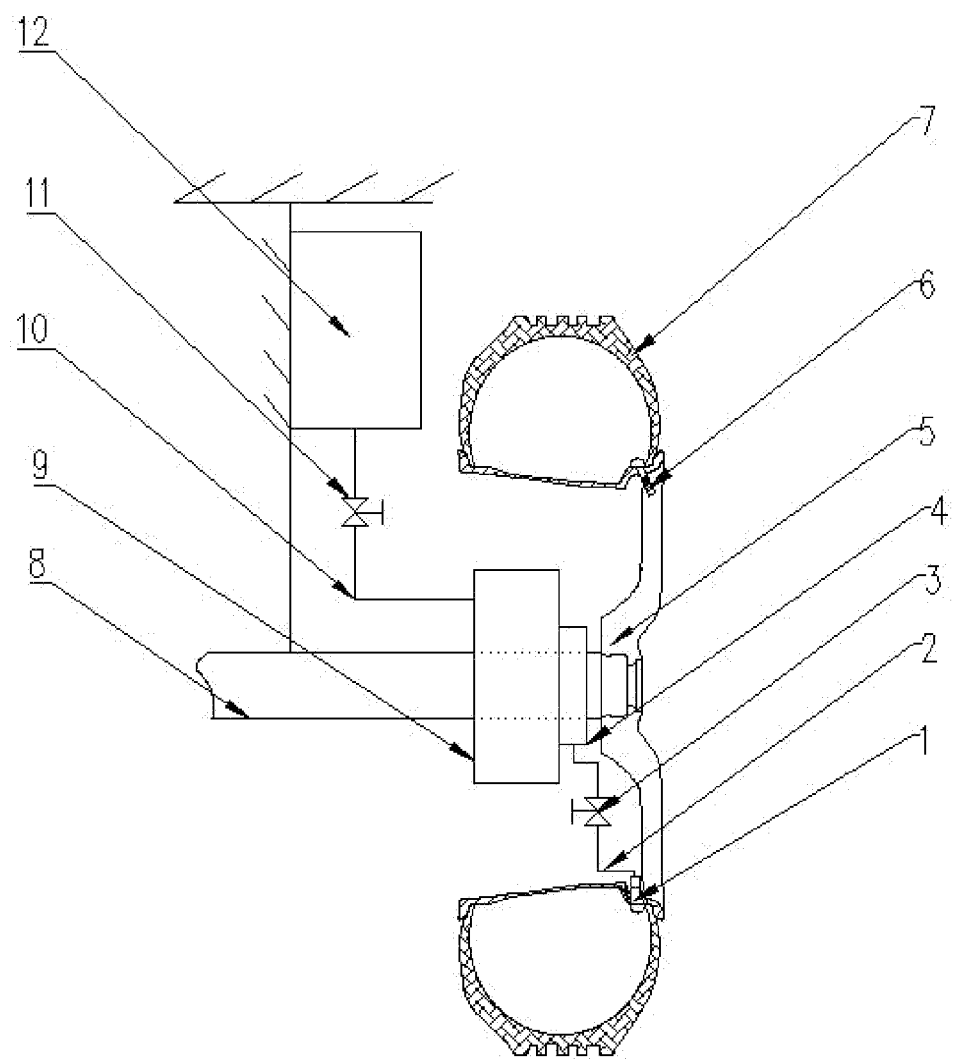
FIG. 1 is a structure diagram of an automatic constant pressure device for a hub tire system.
Figure 2:
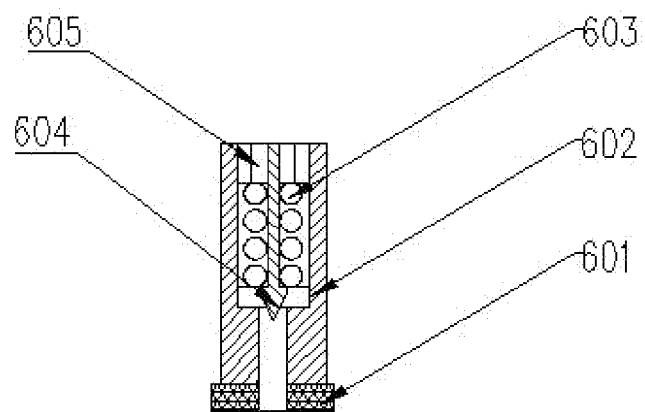
FIG. 2 is a schematic diagram of a pressure relief valve in the automatic constant pressure device for a hub tire system.

In which, 1-valve nozzle, 2-air pipe A, 3-valve, 4-pneumatic slip ring, 5-hub, 6-pressure relief valve, 7-tire, 8-main shaft, 9-air storage tank, 10-air pipe B, 11-valve, 12-vehiclemounted air source, 601-rubber pad, 602-valve body, 603-spring, 604-valve core, 605-nut.

DETAILED DESCRIPTION OF THE EMBODIMENTS

An automatic constant pressure device for a hub tire system will be described in detail below in combination with the accompanying drawings.

An automatic constant pressure device for a hub tire system includes a valve nozzle 1, an air pipe A 2, a valve 3, a pneumatic slip ring 4, a hub 5, a pressure relief valve 6, a tire 7, a main shaft 8, an air storage tank 9, an air pipe B 10, a valve 11 and a vehicle-mounted air source 12.

The pressure relief valve 6 is composed of a rubber pad 601, a valve body 602, a spring 603, a valve core 604 and a nut 605. The rubber pad 601 is assembled on the valve body 602 by fastening, the valve body 602 is hollow and is provided with an internal circular step, the tapered end of the valve core 604 is installed on the internal circular step of the valve body 602, at the same time, the spring 603 is installed on the valve core 604, the nut 605 is installed at the other end of the valve core 604, and the nut 605 is installed on the inner wall of the valve body 602 by threaded connection.

The tire 7 is installed on the hub 5, the hub 5 of the present invention is provided with double valve holes, the valve nozzle 1 is installed at one valve hole, the pressure relief valve 6 is installed at the other valve hole, the phase difference of the two valve holes is 180°, and the main shaft 8 is installed on the center hole of the hub 5.

The air pipe A 2 is installed at the inflatable end of the valve nozzle 1 through threaded connection, the one-way valve 3 is installed on the air pipe A 2, the other end of the one-way valve 3 is connected to the air pipe A 2, and the air pipe A 2 is connected to the pneumatic slip ring 4.

The pneumatic slip ring 4 is installed on the main shaft 8, and the rotating portion of the pneumatic slip ring 4 can rotate synchronously with the hub 5.

The air storage tank 9 is fixed on the main shaft 8, the air pipe B 10 is installed on the air storage tank 9, the valve 11 is installed at the other end of the air pipe B 10, the valve 11 is a solenoid valve, and the other end of the valve 11 is connected to the vehicle-mounted air source 12 through the air pipe B 10.

As described in embodiment 1 above, the automatic constant pressure method of the automatic constant pressure device for the hub tire system, after the tire pressure sensor of the valve nozzle 1 automatically detects the tire pressure, realizes automatic tire pressure control by adopting the automatic control principle. The working principle is: when the pressure in the tire 7 is higher than a set value, for example, the tire pressure is set to 200 kPa±20 kPa, when the tire pressure is higher than 220 kPa, the pressure can be relieved to 200 kPa±20 kPa through the pressure relief valve 6; and when the tire pressure is lower than 180 kPa, the tire 7 can be inflated to 200 kPa±20 kPa through the valve 3.

In the automatic constant pressure device for the hub tire system, the tire pressure sensor can be integrated with a temperature sensor that automatically detects the tire temperature, and the tire temperature is automatically controlled by adopting the automatic control principle. The working principle is: when the temperature in the tire 7 is higher than a set value, for example, the tire temperature is set to 70° C.±10° C., when the tire temperature is higher than 80° C., the temperature can be reduced by circulating the air in the tire 7, that is, the pressure relief valve 6 is opened to relieve the pressure, the valve 3 is opened at the same time to inflate the tire 7, and the tire pressure is kept at 200 kPa±20 kPa while the temperature is reduced; and when the tire temperature is lower than 60° C., the valve 3 is closed to stop inflating the tire 7, and the pressure relief valve 6 is closed at the same time to stop pressure relief.

It is easy for a person skilled in the art to know that the tire pressure in the automobile hub tire system is easily affected by the external environment and tire burst easily occurs, and this problem can be fundamentally solved after the automatic constant pressure device for the hub tire system is adopted. The device is not only suitable for ordinary automobiles, but also suitable for hub motors of new energy vehicles.

The invention claimed is:

1. An automatic constant pressure device for a hub tire system, comprising a valve nozzle, a first air pipe, a one-way valve, a pneumatic slip ring, a hub, a pressure relief valve, a tire, a main shaft, an air storage tank, a second air pipe, a valve and a vehicle-mounted air source, wherein the hub is provided with two valve holes, a phase difference of the two valve holes is 180°, the valve nozzle is installed at one of the two valve holes, and the pressure relief valve is installed at another of the two valve holes;

wherein the pneumatic slip ring is installed on the main shaft, and a rotating portion of the pneumatic slip ring is configured to rotate synchronously with the hub;

wherein the valve nozzle is provided with a tire pressure sensor, the valve nozzle is configured to be integrated with a tire temperature sensor; the first air pipe is installed at an inflatable end of the valve nozzle through a threaded connection, one end of the one-way valve is installed on the first air pipe and another end of the one-way valve is connected to the first air pipe, and the first air pipe is connected to the pneumatic slip ring; the vehicle-mounted air source is installed on the main shaft and on a chassis suspension of a vehicle;

wherein the one-way valve is configured to inflate the tire through the valve nozzle; and wherein the air storage tank is fixed on the main shaft, one end of the second air pipe is installed on the air storage tank, one end of the valve is installed at another end of the second air pipe, and another end of the valve is connected to the vehicle-mounted air source through the second air pipe.

2. The automatic constant pressure device for the hub tire system according to claim 1, wherein the pressure relief valve comprises a rubber pad, a valve body, a spring, a valve core and a nut, wherein the rubber pad is assembled on the valve body fixedly, the valve body is hollow and is provided with an internal circular step, a tapered end of the valve core is installed on the internal circular step of the valve body, the spring is installed on one end of the valve core, the nut is installed at another end of the valve core, and the nut is threadably installed on an inner wall of the valve body.

* * * * *